United States Patent
Sun et al.

(10) Patent No.: US 10,311,289 B2
(45) Date of Patent: Jun. 4, 2019

(54) FACE RECOGNITION METHOD AND DEVICE AND APPARATUS

(71) Applicant: NANCHANG O-FILM BIO-IDENTIFICATION TECHNOLOGY CO., LTD., Nanchang (CN)

(72) Inventors: Wensi Sun, Nanchang (CN); Anpeng Bai, Nanchang (CN)

(73) Assignee: NANCHANG O-FILM BIO-IDENTIFICATION TECHNOLOGY CO., LTD., Nanchang (CN)

( * ) Notice: Subject to any disclaimer, the term of this patent is extended or adjusted under 35 U.S.C. 154(b) by 36 days.

(21) Appl. No.: 15/489,896

(22) Filed: Apr. 18, 2017

(65) Prior Publication Data
US 2018/0089499 A1    Mar. 29, 2018

(30) Foreign Application Priority Data
Sep. 24, 2016  (CN) .......................... 2016 1 0847905

(51) Int. Cl.
  *G06K 9/00* (2006.01)
(52) U.S. Cl.
  CPC ..... *G06K 9/00288* (2013.01); *G06K 9/00228* (2013.01); *G06K 9/00604* (2013.01)
(58) Field of Classification Search
  None
  See application file for complete search history.

(56) References Cited

U.S. PATENT DOCUMENTS

| | | | |
|---|---|---|---|
| 6,575,902 B1* | 6/2003 | Burton | A61B 5/18 340/575 |
| 2011/0038512 A1* | 2/2011 | Petrou | G06F 17/30256 382/118 |
| 2012/0209136 A1* | 8/2012 | Ma | A61B 5/0531 600/547 |
| 2013/0243278 A1* | 9/2013 | Saito | G06K 9/00281 382/128 |
| 2017/0180348 A1* | 6/2017 | Piccolotto | G06K 9/00906 |
| 2018/0060680 A1* | 3/2018 | Alon | G06K 9/00248 |

FOREIGN PATENT DOCUMENTS

WO    WO 2015158087 A1 * 10/2015 ............... G06K 9/00

OTHER PUBLICATIONS

English Translation of WO 2015158087 A1, retrieved from espacenet, Jul. 18, 2018.*

* cited by examiner

*Primary Examiner* — Chan S Park
*Assistant Examiner* — Elisa M Rice
(74) *Attorney, Agent, or Firm* — Hodgson Russ LLP (57) ABSTRACT

The present disclosure relates to the field of biological recognition and provides a face recognition method and device and apparatus. The face recognition method includes: recording a face video image and dynamically tracking an eye in the face video image; detecting a blink frequency of the eye during dynamic tracking of the eye; judging whether the blinking frequency is within a preset frequency range; if the blink frequency is within the preset frequency range, determining that the face is a living face; if the blink frequency is not within the preset frequency range, determining that the face is a fake face. In the embodiment of the present disclosure, the real face and the fake face can be accurately distinguished by the blink frequency of the eye. Therefore, the safety of face recognition is improved.

17 Claims, 4 Drawing Sheets

FACE RECOGNITION METHOD AND DEVICE AND APPARATUS

CROSS-REFERENCE TO RELATED APPLICATION

This application claims priority to and benefits of Chinese Patent Application Serial No. 201610847905.1, filed with the State Intellectual Property Office of P. R. China on Sep. 24, 2016, the entire contents of which are incorporated herein by reference.

FIELD

The present disclosure relates to the field of biological recognition, and more particularly to a face recognition method and device and apparatus.

BACKGROUND

Face recognition is a biological recognition technology which is used to recognize based on human facial feature information. With the development of this technology and the increase of social acceptance, face recognition is now used in many fields, such as face-recognition anti-theft door, face-recognition access control attendance system, police enforcement and criminal investigation for searching criminals, etc.

In recent years, during the development of face recognition technology, there have been cheating behaviors of fake faces. For example, the cheating behavior includes putting a face displayed on the screen by usage of the playback device, such as projector, LCD display, etc. or a three-dimensional model of a face in front of the capturing device of the face recognition system. This may result in the fake face being able to pass the recognition, which brings some social security risks. Therefore, how to perform the face recognition to distinguish between a living face and a fake face has become an urgent problem to be solved.

SUMMARY

Embodiments of the present disclosure provide a face recognition method and device and apparatus, which can accurately distinguish between a fake face and a living face to improve the safety of face recognition.

Embodiments of the present disclosure provide a face recognition method. The method includes:
 recording a face video image and dynamically tracking an eye in the face video image;
 detecting a blink frequency of the eye during dynamic tracking of the eye;
 judging whether the blinking frequency is within a preset frequency range;
 if the blink frequency is within the preset frequency range, determining that the face is a living face;
 if the blink frequency is not within the preset frequency range, determining that the face is a fake face.

Accordingly, embodiments of the present disclosure provide a face recognition device. The device includes:
 a recording unit, configured to record a face video image;
 a processor, the processor comprising:
 a tracking unit, configured to dynamically track an eye in the face video image;
 a detecting unit, configured to detect a blink frequency of the eye during the tracking unit dynamically tracking of the eye;
 a judging unit, configured to judge whether the blinking frequency detected by the detecting unit is within a preset frequency range;
 a determining unit, configured to, when the judging unit judges that the blink frequency is within the preset frequency range, determine that the face is a living face;
 and when the judging unit judges that the blink frequency is not within the preset frequency range, determine that the face is a fake face.

Following are advantages of the embodiments of the present disclosure.

In the embodiments of the present disclosure, the face recognition device can dynamically track the eyes in the face and calculate the blink frequency of the eye during the dynamic tracking process. When the blink frequency of the eye is within the preset frequency range, the face recognition device determines that the face is a living face and when the blink frequency of the eye is not within the preset frequency range, the face recognition device determines that the face is a fake face. Therefore, the real face and the fake face can be accurately distinguished by the blink frequency of the eye, so that the safety of the face recognition can be improved.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

Embodiments of the present disclosure provide a face recognition method, device and apparatus which can accurately distinguish between a fake face and a living face to improve the safety of face recognition. The following are detailed descriptions.

Figure 1:
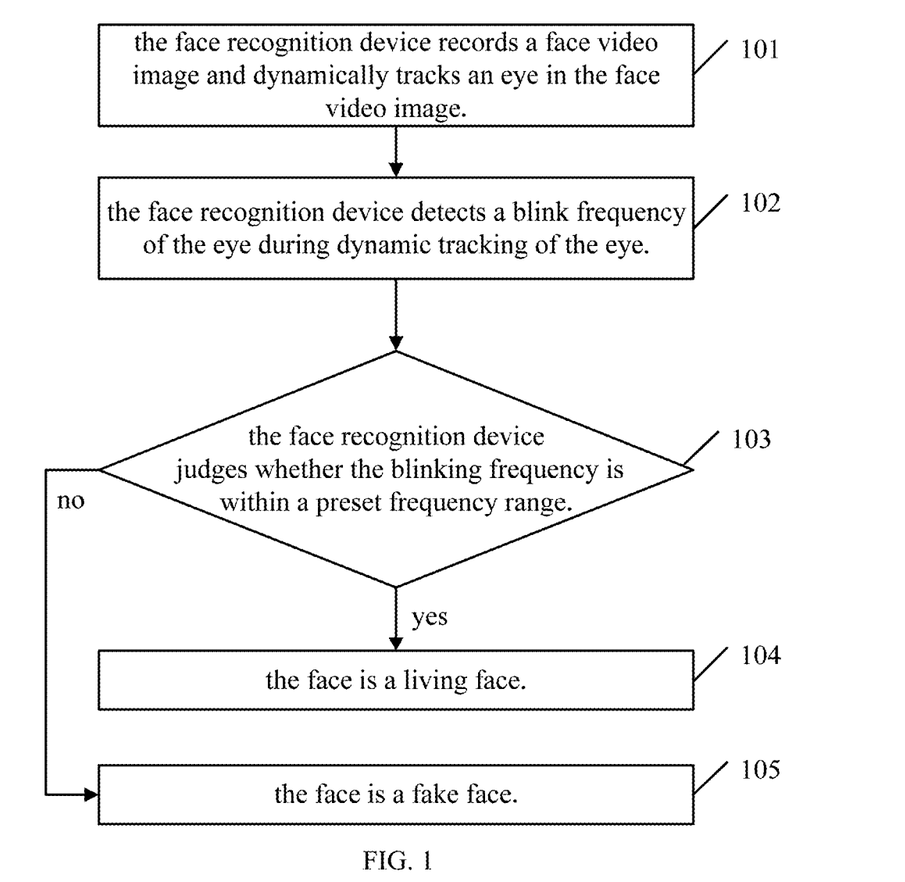
FIG. 1 is a flow chart of a face recognition method according to one embodiment of the present disclosure.

Referring to FIG. 1, FIG. 1 is a flow chart of a face recognition method according to one embodiment of the present disclosure. The method shown in FIG. 1 can be applied to face-recognition anti-theft door, face-recognition access control attendance system, police enforcement and criminal investigations for searching criminals, etc. As shown in FIG. 1, the face recognition method includes following steps:

Step 101, the face recognition device records a face video image and dynamically tracks an eye in the face video image.

In this embodiment of the present disclosure, when a user stands in front of a camera of the face recognition device, the camera can record the face video image of the user, and then locate the face-region image from the face video image, and recognize the facial features of the face according to the face-region image. For example, after locating the face-region image, the face recognition device can determine the position of each feature in the face-region image according to feature information of each feature (such as eye, nose, mouth, ear, eyebrows, forehead, face, etc.) of the face and position relationships between the features.

Therefore, after determining the position of each feature in the face-region image, the face recognition device can dynamically track the user's eye, and more specifically dynamically track the user's eyeball. Specifically, when the user moves within the video image capturing range, the face recognition device can locate the eye in time and then track the movement of the eye (or the eyeball) in the video image.

Step 102, the face recognition device detects a blink frequency of the eye during dynamic tracking of the eye.

In the embodiment of the present disclosure, the face recognition device can detect the blink frequency of the eye during dynamic tracking of the eye.

Specifically, the face recognition device captures a preset number of face images from the face video image at a preset time interval, and then detects the blink frequency of the eye according to the preset number of face images.

The preset time interval may be 0.1 seconds or 0.03 seconds, that is, the face recognition device can capture a frame of an image every 0.1 seconds or 0.03 seconds, which is not limited in the embodiment of the present disclosure. The preset number may be 30 frames, 50 frames or 100 frames, which is not limited in the embodiment of the present disclosure.

In a specific implementation, the face recognition device can detect the state of the eye at different moments from the preset number of the face images. The state of the eye includes the open-eye state and the closed-eye state. When the state of the eye changes from the open-eye state to the closed-eye state, it is recorded as one blink of an eye. The face recognition device can calculate the blink frequency of the eye according to the time interval at which the face image is captured and the order of the blinked face image in the capturing process.

For example, it is assumed that the time interval at which the face recognition device captures the face image is 0.1 seconds, the face recognition device detects that the state of the eye is the closed-eye state in the $12^{th}$-frame face image starting from capturing the first face image, and detects that the state of the eye is the closed-eye state again in the $42^{nd}$-frame face image, then the face recognition device can determine the time interval of two blinks is 3 seconds and estimates that the blink frequency of the user is 20 times/minute.

As an alternative embodiment, the specific manner in which the face recognition device detects the blink frequency of the eye includes following steps of:

11), detecting the eyeball shape and eyeball area of the eye;

12), determining a state of the eye according to the eyeball shape and eyeball area of the eye, the state including an open-eye state and a closed-eye state;

13), recording the number of times the state of the eye changes from the open-eye state to the closed-eye state during a preset time period;

14), determining the number of times as the blink frequency of the eye.

In a specific implementation, the face recognition device may detect the eyeball shape and eyeball area of the eye during dynamic tracking of the eye in the face video image, or may detect the eyeball shape and eyeball area of the eye in the preset number of the face images, i.e., the face recognition device may detect the eyeball shape and eyeball area during the capturing process of the face images at the preset time interval, which is not limited in the embodiments of the present disclosure.

Therefore, after detecting the eye shape and eye area of the eye, the face recognition device can determine whether the eye is currently in the open-eye state or in the closed-eye state according to the detected eyeball shape and eyeball area. Specifically, the face recognition device can detect the shape and area of the eyeball in real time and record the time period for which the current shape and area of the eyeball last. When the last time is greater than or equal to one second, it can be determined that the state of the eye is the open-eye state corresponding to the shape and area. When it is detected that the shape and area of the eyeball greatly changes and the last time is short, such as 0.01 seconds, it can be determined that the state of the eye is the closed-eye state. The process of changing from the open-eye state to the closed-eye state is the blink of the eye.

Meanwhile, after determining the state of the eye, the face recognition device can record the number of times the state of the eye changes from the open-eye state to the closed-eye state in the preset time period in real time. The number of times in the preset time period is the blink frequency of the eye. The preset time period may be 20 seconds, 30 seconds, or 1 minute, which is not limited in the embodiment of the present disclosure.

For another example, it is assumed that the number of times the eye changes from the open-eye state to the closed-eye state is eight times in 20 seconds, recorded by the face recognition device, and the face recognition device can calculate that the blink frequency of the eye is 24 times/minute.

Step 103, the face recognition device judges whether the blinking frequency is within a preset frequency range, if yes, go to step 104, and if no, go to step 105.

For humans, the eye is a very important organ. In order to protect the important eyes, there is a "lid" at the upper and lower sides of the eye, which is the eyelid. A very short time is called for the "instant". Instant can be as the time it takes the eye to blink. Eyelids protect the eyeball from the light or dust damage and allow the tear film to spread to the surface of the eyeball (cornea) with the help of blink of the eye, so that the cornea will not be dry. The blink of the eye is an action to keep the eyeball moist.

Generally, the blink is an action of the two eyes and happens unintentionally. Adult blinks about 20 times/minute, and blink of an eye lasts about 0.3-0.4 seconds for example. If a person blinks 20 times/minute and is awake for 16 hours a day, the number of blink of the person is about 19200 times a day. When the mood of the person is not calm, the number of blink will increase; and when the person focuses on something, the number of blink will be reduced.

In the embodiment of the present disclosure, after detecting the blink frequency of the eye, the face recognition device can judge whether the blink frequency is within the preset frequency range. If the blink frequency is within the preset frequency range, the face is a real face (it also can be said that the face is a face of a living person) and if the blink frequency is not within the preset frequency range, the face is an imitation of the face, i.e., the face is a fake face.

Further, because the blink frequency of the eye can be different when people are in different times and different mood, then the blink frequency of the eye for a normal person can be set to 10 to 30, that is, the preset frequency range can be 10 to 30 times/minute, which is not limited in the embodiment of the present disclosure.

Step 104, the face recognition device determines that the face is a living face.

In the embodiment of the present disclosure, when the face recognition device determines that the blinking frequency of the eye is within the preset frequency range, the face recognition device determines that the face is a living face in a certain degree.

Step 105, the face recognition device determines that the face is a fake face. In the embodiment of the present disclosure, when the face recognition device determines that the blink frequency of the eye is not within the preset frequency range, the face recognition device determines the face is a fake face in a certain degree.

Further, when the face recognition device determines that the blink frequency of the eye is not within the preset frequency range, the face recognition device may output a warning indicative of the face being a fake face.

For example, some bank insurance systems need to obtain access to the vault through face recognition. If the criminal manufactures a fake face, the face recognition device identifies that the face has an access to the vault after the face passes the face recognition. The face recognition device can judge whether the blink frequency of the eye is within the preset frequency range by capturing the face video image and calculating the blink frequency of the eye in the face video image. If the blink frequency of the eye is within the preset frequency range, it indicates that face is a living face in a certain degree. If the face does not pass the face recognition of the face recognition device, or the blink frequency of the eye is not within the preset frequency range, the face recognition device can output a warning to warn the bank staff or the police that the vault has a security risk. After receiving the warning, the bank staff or the police can take the appropriate actions to protect the safety of property.

In the method described in FIG. 1, the face recognition device can dynamically track the eyes in the face and calculate the blink frequency of the eye during the dynamic tracking process. When the blink frequency of the eye is within the preset frequency range, the face recognition device determines that the face is a living face and when the blink frequency of the eye is not within the preset frequency range, the face recognition device determines that the face is a fake face. Therefore, the real face and the fake face can be accurately distinguished by the blink frequency of the eye, so that the safety of the face recognition can be improved.

Figure 2:
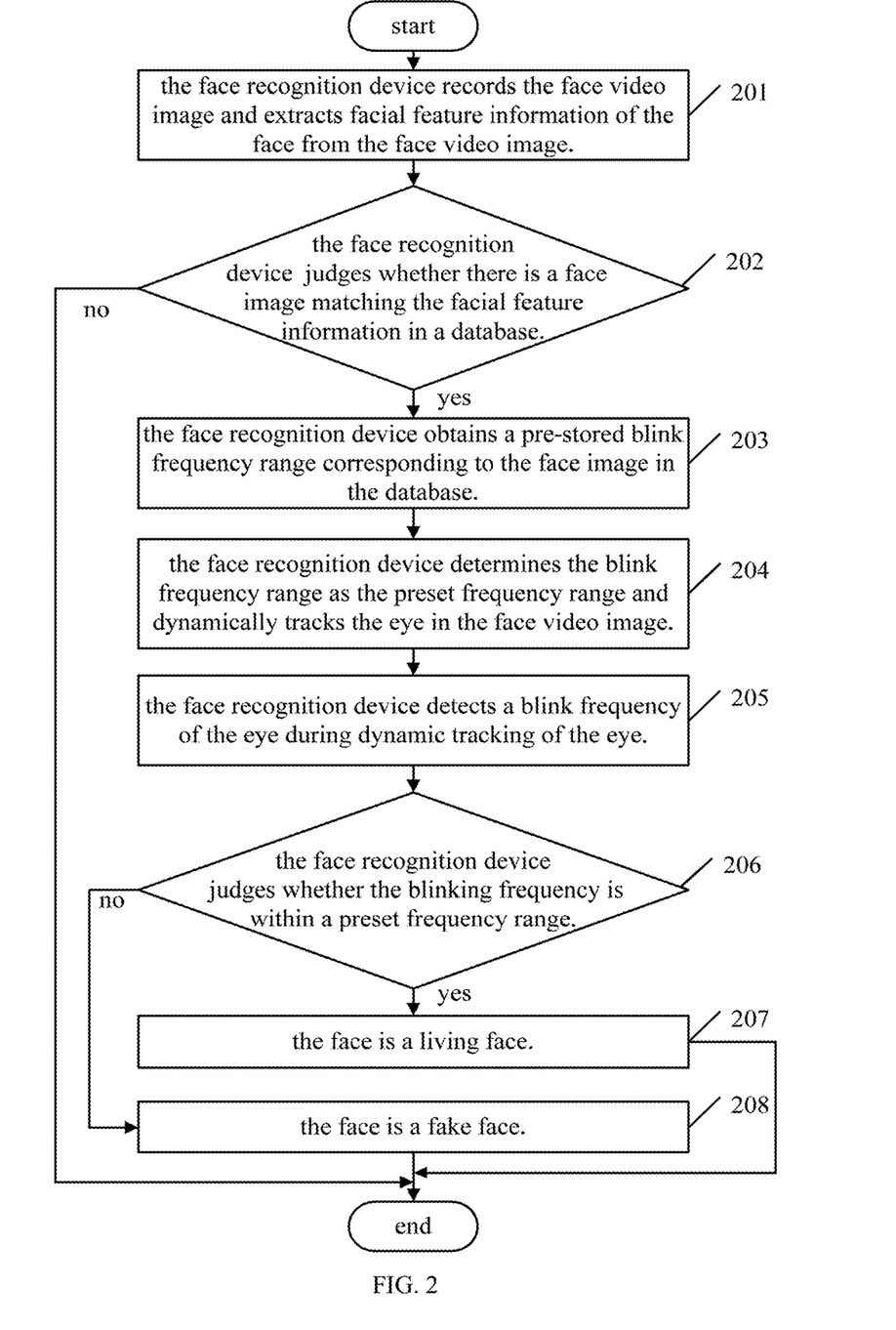
FIG. 2 is a flow chart of a face recognition method according to another embodiment of the present disclosure.

Referring to FIG. 2, FIG. 2 is a flow chart of a face recognition method according to another embodiment of the present disclosure. As shown in FIG. 2, the face recognition method includes following steps.

Step 201, the face recognition device records the face video image and extracts facial feature information of the face from the face video image.

The facial feature information may include the position information of each feature of the face and the position relationships between the individual features, which is not limited in the embodiment of the present disclosure.

In the embodiment of the present disclosure, the face recognition device may store the position information of each feature of a face region in advance. After recording the face video image, first, the face recognition device determines the face region in the face video image and searches the position of each feature in the face video image according to the position information of each feature of the stored face region. Specifically, the face recognition device covers the pre-stored face-region image onto the face video image and searches the position of each feature in the face region of the face video image corresponding to vicinity of the position of each feature in the covered pre-stored face-region image, so as to determine the facial feature information of the face in the face video image.

Step 202, the face recognition device judges whether there is a face image matching the facial feature information in a database, if yes, go to step 203 and if no, the process ends.

In the embodiment of the present disclosure, different face images may be pre-stored in the database. The database may be a local database of the face recognition device or a database of the server. When the database is a database of the server, the face recognition device may synchronize or obtain the stored face images from the server.

In the embodiment of the present disclosure, after determining the facial feature information of the user in the face video image, the face recognition device can perform face recognition. For example, the face recognition device searches the face image matching the facial feature information in the database according to the template matching method.

It is noted that, the face image matching the facial feature information can be understood as that, when the similarity between the facial feature information and the facial feature information of the face image stored in the database exceeds a preset ratio, the face recognition device determines that there is a face image matching the facial feature information in the database. The preset ratio can be set to 85%, 90%, or 95%, which is not limited in the embodiments of the present disclosure.

Specifically, the features, such as the eyes, the nose, the mouth and the eyebrows, of the user's face in the face video image are found, and are compared to the features corresponding to the face in each face image in the database. For example, the size and the shape, etc. of the features are compared. If the similarity exceeds the preset ratio, it can be determined that the user in the face video image and the user in the face image in the database are the same users. Further, if a number of face images whose similarity exceeds the ratio are determined, the face image having the highest similarity is determined as a face image matching the face image of the user in the face video image.

Alternatively, the face recognition device may use other methods to perform face recognition. The other methods include a method based on singular value features, a subspace analysis method, a locality preserving projection method, a principal components analysis method, a method based on image features, a method based on time-varying parameter model, etc.

Step 203, the face recognition device obtains a pre-stored blink frequency range corresponding to the face image in the database.

In the embodiment of the present disclosure, the face recognition device may calculate the blink frequency range of the user by obtaining the blink frequency of the user many times when storing the face images of the different users. The face recognition device can store the blink frequency range of the user. After the face image matching the facial feature information of the user in the face video image is found in the database, the face recognition device obtains the blink frequency range corresponding to the face image in the database so that the blink frequency range is used as a standard to judge whether the face in the face video image is a living face.

Step 204, the face recognition device determines the blink frequency range as the preset frequency range and dynamically tracks the eye in the face video image.

In the embodiment of the present disclosure, after obtaining the blink frequency range corresponding to the face image, the face recognition device can set the blink frequency range as the preset frequency range as a standard to judge whether the face in the face video image is a living face.

Step 205, the face recognition device detects a blink frequency of the eye during dynamic tracking of the eye.

It is noted that, the order of the step of determining the preset frequency range by the face recognition device and the step of detecting the blink frequency of the eye can be changed or the two steps can be performed simultaneously, which is not limited in the embodiment of the present disclosure.

Step 206, the face recognition device judges whether the blinking frequency is within a preset frequency range, if yes, go to step 207, and if no, go to step 208.

Step 207, the face being a living face is determined, and the process ends. In one embodiment, the face recognition device determines that the face is a living face in the step 207.

Step 208, the face being a fake face is determined, and the process ends. In one embodiment, the face recognition device determines that the face is a fake face.

In the method described in FIG. 2, the face recognition device can judge whether the face is a living face or a fake face by judging whether the blink frequency of the eye in the face video image is within the preset frequency range to accurately distinguish the real face and the fake face. The face recognition device can also perform face recognition to the user in the face video image, search the face image matching the facial features of the user in the database, and obtain the blink frequency range corresponding to the face image. The blink frequency range is used as a standard to judge whether the face in the face video image is a living face. This not only improves the accuracy of distinguishing the real face and the fake face, but also improves the accuracy of face recognition.

Figure 3:
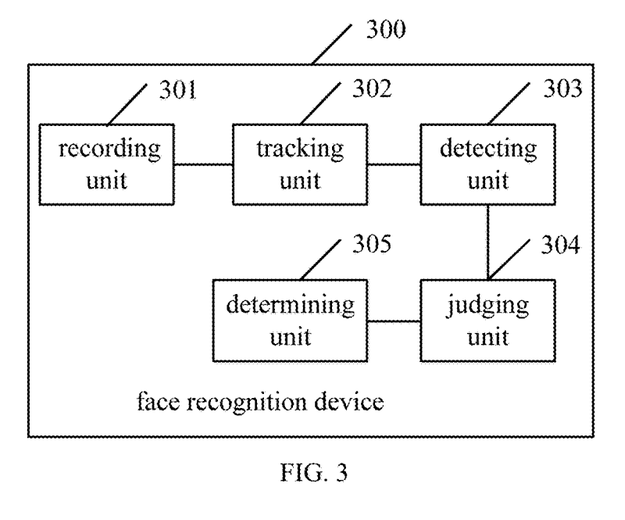
FIG. 3 is a block diagram of a face recognition device according to one embodiment of the present disclosure.

Referring to FIG. 3, FIG. 3 is a block diagram of a face recognition device according to one embodiment of the present disclosure. As shown in FIG. 3, the face recognition device 300 includes following units.

A capturing unit 301 is configured to record a face video image.

A tracking unit 302 is configured to dynamically track an eye in the face video image.

A detecting unit 303 is configured to detect a blink frequency of the eye during the tracking unit 302 dynamically tracking of the eye.

A judging unit 304 is configured to judge whether the blinking frequency detected by the detecting unit 303 is within a preset frequency range.

A determining unit 305 is configured to, when the judging unit 304 judges that the blink frequency is within the preset frequency range, determine that the face is a living face.

The determining unit 305 is further configured to, when the judging unit 304 judges that the blink frequency is not within the preset frequency range, determine that the face is a fake face.

In the embodiment of the present disclosure, the face recognition device 300 can accurately distinguish the real face and the fake face by the blink frequency of the eye. Therefore, the safety of face recognition is improved.

Figure 4:
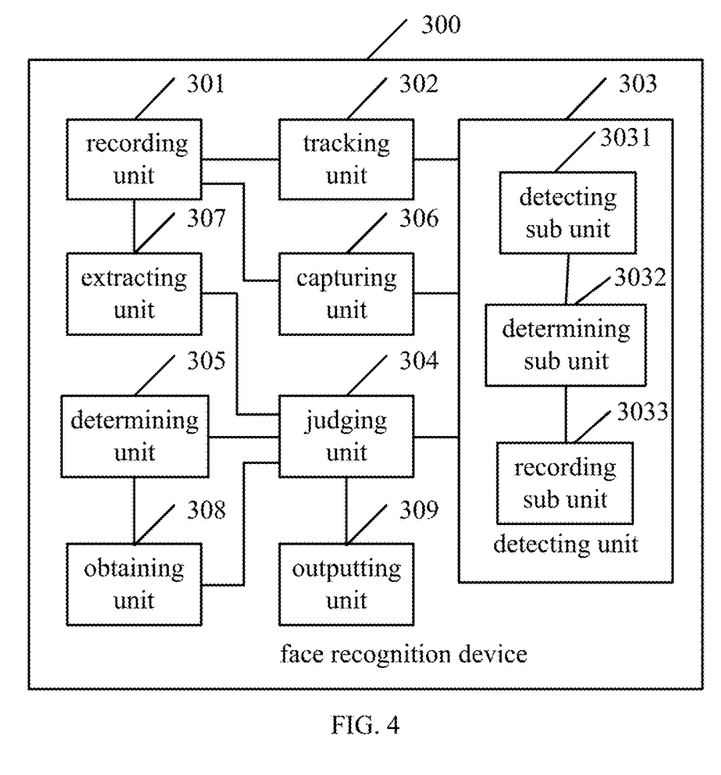
FIG. 4 is a block diagram of a face recognition device according to another embodiment of the present disclosure.

Please referring to FIG. 4, FIG. 4 is a block diagram of a face recognition device according to another embodiment of the present disclosure. The face recognition device 300 as described in FIG. 4 is an alternative device based on the face recognition device 300 as described in FIG. 3. As shown in FIG. 4, the face recognition device 300 further includes following units.

A capturing unit 306 is configured to capture a preset number of face images from the face video image recorded by the recording unit 301 at a preset time interval.

Correspondingly, the detecting unit 303 detecting the blinking frequency of the eye, includes detecting the blink frequency of the eye according to the preset number of face images.

Further, in one embodiment, the detecting unit 303 includes a detecting sub unit 3031, a determining sub unit 3032 and a recording sub unit 3033.

The detecting sub unit 3031 is configured to detect the eyeball shape and eyeball area of the eye.

The determining sub unit 3032 is configured to determine a state of the eye according to the eyeball shape and eyeball area of the eye, the state including an open-eye state and a closed-eye state.

The recording sub unit 3033 is configured to record the number of times the state of the eye changes from the open-eye state to the closed-eye state during a preset time period.

The determining sub unit 3032 is further configured to determine the number of times as the blink frequency of the eye.

In a specific implementation, the detecting sub unit 3031 may detect the eyeball shape and eyeball area of the eye during dynamic tracking of the eye in the face video image, or may detect the eyeball shape and eyeball area of the eye in the preset number of the face images, i.e., the detecting sub unit 3031 may detect the eyeball shape and eyeball area during the process of the capturing unit 306 capturing the face images at the preset time interval, which is not limited in the embodiments of the present disclosure.

Therefore, after the detecting sub unit 3031 detecting the eye shape and eye area of the eye, the determining sub unit 3032 can determine whether the eye is currently in the open-eye state or in the closed-eye state according to the detected eyeball shape and eyeball area. Specifically, the determining sub unit 3032 can detect the shape and area of the eyeball in real time and record the time period for which the current shape and area of the eyeball last. When the last time is greater than or equal to one second, it can be determined that the state of the eye is the open-eye state corresponding to the shape and area. When it is detected that the shape and area of the eyeball greatly changes and the last time is short, such as 0.01 seconds, it can be determined that the state of the eye is the closed-eye state. The process of changing from the open-eye state to the closed-eye state is the blink of the eye.

Meanwhile, after the determining sub unit 3032 determining the state of the eye, the recording sub unit 3033 can record the number of times the state of the eye changes from the open-eye state to the closed-eye state in the preset time period in real time. The number of times in the preset time period is the blink frequency of the eye. The preset time period may be 20 seconds, 30 seconds, or 1 minute, which is not limited in the embodiment of the present disclosure.

Alternatively, the face recognition device 300 further includes an extracting unit 307 and an obtaining unit 308.

The extracting unit 307 is configured to extract facial feature information of the face from the face video image recorded by the recording unit 301;

The judging unit 304 is configured to judge whether there is a face image matching the facial feature information extracted by the extracting unit 307 in a database.

The obtaining unit 308 is configured to, when the judging unit 304 judges that there is a face image matching the facial feature information in the database, obtain a pre-stored blink frequency range corresponding to the face image in the database;

The determining unit 305 is configured to determine the blink frequency range as the preset frequency range.

The facial feature information may include the position information of each feature of the face and the position relationships between the individual features, which is not limited in the embodiment of the present disclosure. The database may be a local database of the face recognition device 300 or a database of the server, which is not limited in the embodiment of the present disclosure.

It is noted that, the face image matching the facial feature information can be understood as that, when the similarity between the facial feature information and the facial feature information of the face image stored in the database exceeds a preset ratio, the face recognition device determines that there is a face image matching the facial feature information in the database. The preset ratio can be set to 85%, 90%, or 95%, which is not limited in the embodiments of the present disclosure.

Alternatively, the face recognition device 300 further includes an outputting unit 309 configured to, if the blink frequency is not within the preset frequency range, output a warning indicative of the face being a fake face.

In one embodiment, the face recognition device 300 includes a processor. The processor includes the tracking unit 302, the detecting unit 303, the judging unit 304, the determining unit 305, the extracting unit 307, and the obtaining unit 308.

In one embodiment, the face recognition device 300 includes a camera. The camera includes the recording unit 301 and the capturing unit 306.

In the devices described in FIG. 3 and FIG. 4, the face recognition device can judge whether the face is a living face or a fake face by judging whether the blink frequency of the eye in the face video image is within the preset frequency range to accurately distinguish the real face and the fake face. The face recognition device can also perform face recognition to the user in the face video image, search the face image matching the facial features of the user in the database, and obtain the blink frequency range corresponding to the face image. The blink frequency range is used as a standard to judge whether the face in the face video image is a living face. This not only improves the accuracy of distinguishing the real face and the fake face, but also improves the accuracy of face recognition.

Figure 5:
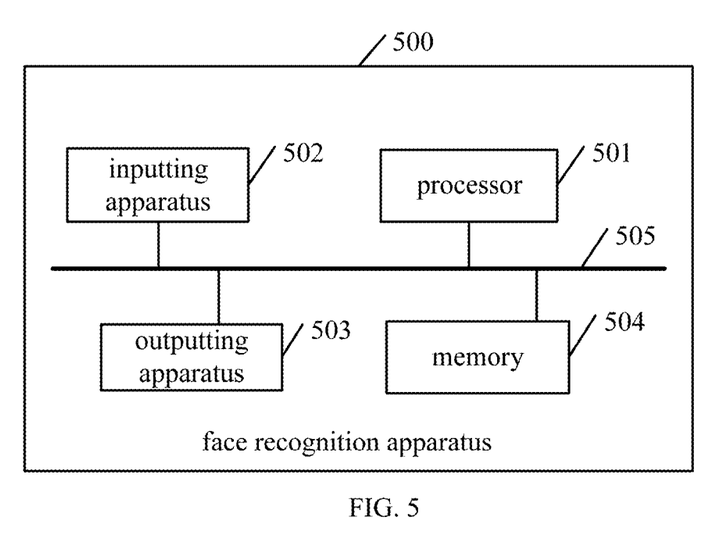
FIG. 5 is a block diagram of a face recognition apparatus according to one embodiment of the present disclosure.

Referring to FIG. 5, FIG. 5 is a block diagram of a face recognition apparatus according to one embodiment of the present disclosure. The face recognition apparatus 500 includes one or more processors 501, one or more inputting apparatus 502, one or more outputting apparatus 503 and a memory 504. The processor 501, the inputting apparatus 502, the outputting apparatus 503 and the memory 504 are connected by bus 505. The memory 504 is configured to store instructions. The processor 501 is configured to execute the instructions stored in the memory 504.

The inputting apparatus 502 is configured to record a face video image.

when executing the instructions stored in the memory 504, the processor 501 is configured to dynamically track an eye in the face video image, detect a blink frequency of the eye during dynamic tracking of the eye;

judge whether the blinking frequency is within a preset frequency range;

if the blink frequency is within the preset frequency range, determine that the face is a living face;

if the blink frequency is not within the preset frequency range, determine that the face is a fake face.

Alternatively, the inputting apparatus 502 is further configured to capture a preset number of face images from the face video image at a preset time interval.

the processor 501 detecting the blink frequency of the eye during dynamic tracking of the eye, includes:

detecting the blink frequency of the eye according to the preset number of face images.

Further, the processor 501 detecting the blink frequency of the eye includes:

detecting the eyeball shape and eyeball area of the eye; determining a state of the eye according to the eyeball shape and eyeball area of the eye, the state including an open-eye state and a closed-eye state; recording the number of times the state of the eye changes from the open-eye state to the closed-eye state during a preset time period; determining the number of times as the blink frequency of the eye.

In a specific implementation, the processor 501 may detect the eyeball shape and eyeball area of the eye during dynamic tracking of the eye in the face video image, or may detect the eyeball shape and eyeball area of the eye in the preset number of the face images, i.e., the processor 501 may detect the eyeball shape and eyeball area during the capturing process of the face images at the preset time interval, which is not limited in the embodiments of the present disclosure.

Therefore, after capturing the eye shape and eye area of the eye, the processor 501 can determine whether the eye is currently in the open-eye state or in the closed-eye state according to the detected eyeball shape and eyeball area. Specifically, the processor 501 can detect the shape and area of the eyeball in real time and record the time period for which the current shape and area of the eyeball last. When the last time is greater than or equal to one second, it can be determined that the state of the eye is the open-eye state corresponding to the shape and area. When it is detected that the shape and area of the eyeball greatly changes and the last time is short, such as 0.01 seconds, it can be determined that the state of the eye is the closed-eye state. The process of changing from the open-eye state to the closed-eye state is the blink of the eye.

Meanwhile, after determining the state of the eye, the processor 501 can record the number of times the state of the eye changes from the open-eye state to the closed-eye state in the preset time period in real time. The number of times in the preset time period is the blink frequency of the eye. The preset time period may be 20 seconds, 30 seconds, or 1 minute, which is not limited in the embodiment of the present disclosure.

Alternatively, the processor 501 is further configured to extract facial feature information of the face from the face video image recorded by the inputting apparatus 502; judge whether there is a face image matching the facial feature information in a database; if there is a face image matching the facial feature information in the database, obtain a pre-stored blink frequency range corresponding to the face image in the database, and determine the blink frequency range as the preset frequency range.

The facial feature information may include the position information of each feature of the face and the position relationships between the individual features. The database may be a local database of the face recognition apparatus 500 or a database of a server, which is not limited in the embodiment of the present disclosure.

It is noted that, the face image matching the facial feature information can be understood as that, when the similarity between the facial feature information and the facial feature information of the face image stored in the database exceeds a preset ratio, it is determined that there is a face image matching the facial feature information in the database. The preset ratio can be set to 85%, 90%, or 95%, which is not limited in the embodiments of the present disclosure.

Alternatively, the outputting apparatus 503 is configured to, when the processor 501 judges that the blink frequency is not within the preset frequency range, output a warning indicative of the face being a fake face.

In the face recognition apparatus described in FIG. 5, the face recognition apparatus can judge whether the face is a living face or a fake face by judging whether the blink frequency of the eye in the face video image is within the preset frequency range to accurately distinguish the real face and the fake face. The face recognition apparatus can also perform face recognition to the user in the face video image, search the face image matching the facial features of the user in the database, and obtain the blink frequency range corresponding to the face image. The blink frequency range is used as a standard to judge whether the face in the face video image is a living face. This not only improves the accuracy of distinguishing the real face and the fake face, but also improves the accuracy of face recognition.

It is to be understood that, in the embodiments of the present disclosure, the processor 501 can be a central processing unit (CPU). The processor also can be a general processor, a digital signal processor (DSP), an application specific integrated circuit (ASIC), a field-programmable gate array (FPGA) or other programmable logic devices, discrete gates or transistor logic devices, discrete hardware components, etc. The general processor can be a microprocessor or the processor also can be any conventional processor.

In some embodiment, the inputting apparatus 502 includes a touch panel, a camera (the camera is used to record the face video image or capture the face image), a microphone, etc. In some embodiment, the outputting apparatus 503 includes a display (an LCD for example), and a speaker, etc. In some embodiment, the outputting apparatus 503 includes a display (an LCD for example), etc. In some embodiment, the outputting apparatus 503 includes a speaker, etc.

In some embodiment, the memory 504 includes read-only memory and random access memory, and provides instructions and data to the processor 501. A portion of the memory 504 may also include a non-volatile random access memory. For example, the memory 504 may also store information about the device type.

In a specific implementation, the processor 501, the inputting apparatus 502, and the outputting apparatus 503 described in the embodiments of the present disclosure can perform the implementations described in the first embodiment and the second embodiment of the face recognition method disclosed in the embodiments of the present disclosure and the implementation of the face recognition device/apparatus described in the embodiment of the present disclosure, and detailed descriptions are omitted.

Those of ordinary skill in the art can understand that implementing all or parts of the processes in the method of the embodiments described above may be accomplished by computer programs commanding the associated hardware. The computer programs can be stored in a computer-readable storage medium. When the programs are executed, the flows of the method in the above embodiments are included during the execution of the programs. The storage medium may be a magnetic disk, an optical disk, a read-only memory (ROM), a random access memory (RAM), or the like.

It is intended that the equivalents of the claims of the present disclosure be covered by the scope of the present disclosure without departing from the scope of the disclosure as defined by the above embodiments of the present disclosure.

What is claimed is:

1. A face recognition method, comprising:
   recording a face video image and dynamically tracking an eye in the face video image;
   detecting a blink frequency of the eye during dynamic tracking of the eye;
   judging whether the blinking frequency is within a preset frequency range;
   if the blink frequency is within the preset frequency range, determining that the face is a living face;
   if the blink frequency is not within the preset frequency range, determining that the face is a fake face;
   the method further comprises:
   extracting facial feature information of the face from the face video image;
   judging whether there is a face image matching the facial feature information in a database;
   if there is a face image matching the facial feature information in the database, obtaining a pre-stored blink frequency range corresponding to the face image in the database;
   determining the blink frequency range as the preset frequency range.

2. The method of claim 1, wherein, before detecting the blink frequency of the eye, the method further comprises:
   capturing a preset number of face images from the face video image at a preset time interval;
   detecting the blinking frequency of the eye, comprising:
   detecting the blink frequency of the eye according to the preset number of face images.

3. The method of claim 1, wherein, detecting the blinking frequency of the eye comprises:
   detecting the eyeball shape and eyeball area of the eye;
   determining a state of the eye according to the eyeball shape and eyeball area of the eye, the state comprising an open-eye state and a closed-eye state;
   recording the number of times the state of the eye changes from the open-eye state to the closed-eye state during a preset time period;
   determining the number of times as the blink frequency of the eye.

4. The method of claim 1, wherein, extracting the facial feature information of the face from the face video image comprises:
   determining a face region of the face video image,
   covering a pre-stored face-region image onto the face video image and searching the position of each feature in the face region of the face video image corresponding to vicinity of the position of each feature in the covered pre-stored face-region image, so as to determine the facial feature information of the face in the face video image.

5. The method of claim 1, wherein, judging whether there is a face image matching the facial feature information in a database comprises:
when the similarity between the facial feature information and the facial feature information of the face image stored in the database exceeds a preset ratio, determining that there is a face image matching the facial feature information in the database.

6. The method of claim 1, wherein, the method further comprises:
if the blink frequency is not within the preset frequency range, outputting a warning indicative of the face being a fake face.

7. A face recognition device, comprising:
a camera, the camera comprising a recording unit, configured to record a face video image;
a processor, the processor comprising:
a tracking unit, configured to dynamically track an eye in the face video image;
a detecting unit, configured to detect a blink frequency of the eye during the tracking unit dynamically tracking of the eye;
a judging unit, configured to judge whether the blinking frequency detected by the detecting unit is within a preset frequency range;
a determining unit, configured to, when the judging unit judges that the blink frequency is within the preset frequency range, determine that the face is a living face;
and when the judging unit judges that the blink frequency is not within the preset frequency range, determine that the face is a fake face;
the processor further comprises:
an extracting unit, configured to extract facial feature information of the face from the face video image recorded by the recording unit;
the judging unit, configured to judge whether there is a face image matching the facial feature information extracted by the extracting unit in a database;
the processor further comprises a obtaining unit, configured to, when the judging unit judges that there is a face image matching the facial feature information in the database, obtain a pre-stored blink frequency range corresponding to the face image in the database;
the determining unit, configured to determine the blink frequency range as the preset frequency range.

8. The device of claim 7, wherein, the camera further comprises a capturing unit configured to capture a preset number of face images from the face video image recorded by the recording unit at a preset time interval;
the detecting unit detecting the blinking frequency of the eye, comprises:
detecting the blink frequency of the eye according to the preset number of face images.

9. The device of claim 7, wherein, the detecting unit comprises:
a detecting sub unit, configured to detect the eyeball shape and eyeball area of the eye;
a determining sub unit, configured to determine a state of the eye according to the eyeball shape and eyeball area of the eye, the state comprising an open-eye state and a closed-eye state;
a recording sub unit, configured to record the number of times the state of the eye changes from the open-eye state to the closed-eye state during a preset time period;
the determining sub unit, further configured to determine the number of times as the blink frequency of the eye.

10. The device of claim 7, wherein, the extracting unit is further configured to determine a face region of the face video image, cover a pre-stored face-region image onto the face video image and search the position of each feature in the face region of the face video image corresponding to vicinity of the position of each feature in the covered pre-stored face-region image, so as to determine the facial feature information of the face in the face video image.

11. The device of claim 7, wherein, the judging unit is further configured to, when the similarity between the facial feature information and the facial feature information of the face image stored in the database exceeds a preset ratio, determine that there is a face image matching the facial feature information in the database.

12. The device of claim 7, wherein, the face recognition device further comprises:
a display and/or a speaker, configured to, if the blink frequency is not within the preset frequency range, output a warning indicative of the face being a fake face.

13. A face recognition apparatus, comprising:
one or more processors, one or more inputting apparatus, and a memory, the memory being configured to store instructions, the processor being configured to execute the instructions stored in the memory;
the inputting apparatus being configured to record a face video image;
when executing the instructions stored in the memory, the processor being configured to dynamically track an eye in the face video image, detect a blink frequency of the eye during dynamic tracking of the eye;
judge whether the blinking frequency is within a preset frequency range;
if the blink frequency is within the preset frequency range, determine that the face is a living face;
if the blink frequency is not within the preset frequency range, determine that the face is a fake face;
the processor is further configured to:
extract facial feature information of the face from the face video image recorded by the recording unit;
judge whether there is a face image matching the facial feature information in a database;
if there is a face image matching the facial feature information in the database, obtain a pre-stored blink frequency range corresponding to the face image in the database, and determine the blink frequency range as the preset frequency range.

14. The apparatus of claim 13, wherein, the inputting apparatus is further configured to capture a preset number of face images from the face video image at a preset time interval;
the processor detecting the blink frequency of the eye during dynamic tracking of the eye, comprising:
detecting the blink frequency of the eye according to the preset number of face images.

15. The apparatus of claim 13, wherein the processor detecting the blink frequency of the eye comprises:

detecting the eyeball shape and eyeball area of the eye;
determining a state of the eye according to the eyeball shape and eyeball area of the eye, the state comprising an open-eye state and a closed-eye state;
recording the number of times the state of the eye changes from the open-eye state to the closed-eye state during a preset time period;
determining the number of times as the blink frequency of the eye.

16. The apparatus of claim 13, wherein the face recognition apparatus further comprises an outputting apparatus configured to, when the processor judges that the blink frequency is not within the preset frequency range, output a warning indicative of the face being a fake face.

17. The apparatus of claim 16, wherein the inputting apparatus comprises a camera, and the outputting apparatus comprises a display and/or a speaker.

* * * * *